July 3, 1956 A. YUDIN 2,753,127

REEL FOR THIN TAPES

Filed Oct. 16, 1953

INVENTOR

AVERY YUDIN

BY

Kenyon & Kenyon

ATTORNEYS

United States Patent Office 2,753,127

Patented July 3, 1956

2,753,127

REEL FOR THIN TAPES

Avery Yudin, New York, N. Y.

Application October 16, 1953, Serial No. 386,559

4 Claims. (Cl. 242—74)

One of the problems in the use of thin flexible tapes, such as certain types of magnetic recording tapes currently on the market, is that of initiating the winding of the tape on its spool or reel. This is particularly troublesome where the tapes are very short in width, which makes it difficult to insert the end of the tape in between the closely-spaced discs of the spool in order to attach it to the hub. This invention greatly simplifies the operation and makes it possible for the operator to attach the tape end near the hub very quickly so that he can initiate winding. The reel and tape arrangement shown in the attached drawing will illustrate.

Figure 1:
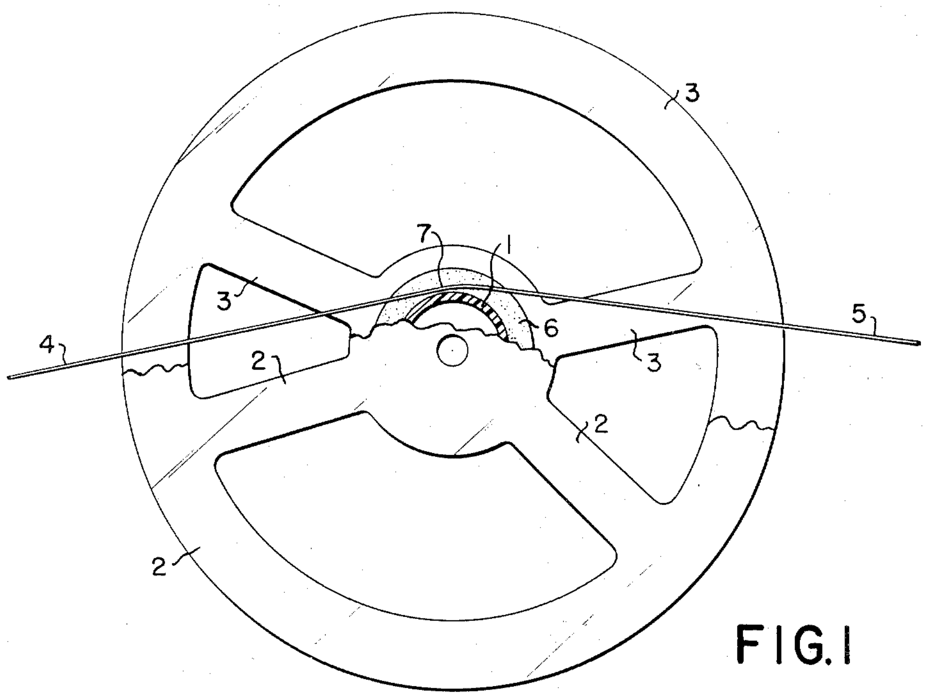
Figure 2:
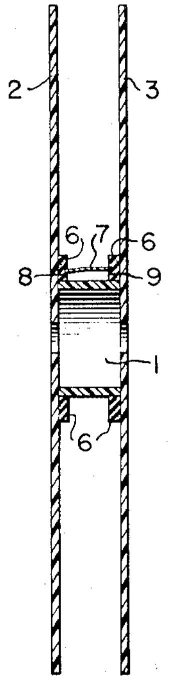

The Figure 1 is a side view, partly broken away, of a suitable reel or spool used for the winding of very flimsy tapes in magnetic recording equipment. Figure 2 is a cross-section of Figure 1.

The illustrated reel comprises a hub 1 and side discs or frames 2 and 3, all made of any suitable material. With conventional reels now on the market it is necessary to insert the end 4 of a magnetic tape 5 into a slit in the hub for a preliminary hold while initiating winding. This, of course, can be very clumsy if the discs 2 and 3 are very close together and of considerable radial extent as is usually the case.

To avoid the difficulty just indicated, I provide annular layers 6 of sponge rubber affixed to the discs 2 and 3 near the hub 1. With this arrangement the operator need only grasp the end 4 in one hand and some other point of the tape 5 in the other, and then draw the intermediate portion between the discs 2 and 3 by pulling with his hands. He may continue pulling until the intermediate portion 7 of the tape is engaged between the layers 6. For reasons presently to be indicated, the tape will be held firmly enough in this position by the sponge rubber to permit the operator to wind the remaining portion of the tape onto the hub.

I am aware that arrangements having an apparent similarity to the foregoing, using metal springs in the place of the layers 6, have been suggested. However, these are completely unsatisfactory for extremely thin tapes because the metal is too stiff and rigid to grasp the tape. Apparently the reason for the success of the above arrangement is the fact that the sponge rubber is extremely flexible itself and so easily compressed that the side edges 8 and 9 of the tape 5, even though the tape is extremely flexible and thin, can imbed themselves to a considerable extent in the sponge rubber. This means that the rubber not only grasps the side edges themselves, but also bulges over and grasps the tape on its opposite surfaces to a certain extent, i. e., it bulges over toward the center line of the tape to a certain extent and clamps down on the opposite faces of the tape.

It is to be understood, of course, that other materials having the foregoing characteristics will be found to do the job. Either sponge or foam rubber or other elastomeric material will do as well as probably certain types of felt materials. Moreover the layers 6 may cover any suitable extent of the periphery surrounding the hub; it need not extend all the way around. The structure of the hub and the side discs may, of course, take on many different forms.

What I claim is:

1. A reel for winding very thin flexible tapes, having near the hub a layer of very flexible material which will give way under the slight pressure of the tape edge and bulge around the edge to grasp the same.

2. A reel as in claim 1 in which the material is sponge or foam rubber.

3. A reel for winding very thin flexible tapes for magnetic recordings, having near the hub and on the side discs at each side a layer of very flexible material which will give under the pressure of the side edges of the tape sufficiently to permit those side edges to imbed themselves in the material with the material bulging over to grasp the opposite surfaces of the tape.

4. A reel as in claim 3 in which the material is sponge or foam rubber, or other elastomeric material.

References Cited in the file of this patent

UNITED STATES PATENTS

| | | |
|---|---|---|
| 2,180,420 | Larsen | Nov. 21, 1939 |
| 2,226,825 | McAuley | Dec. 31, 1940 |
| 2,392,492 | Morgan et al. | Jan. 8, 1946 |

FOREIGN PATENTS

| | | |
|---|---|---|
| 379,677 | Italy | Apr. 2, 1940 |